United States Patent
Nouchi et al.

(10) Patent No.: US 7,609,355 B2
(45) Date of Patent: Oct. 27, 2009

(54) CURVED LIQUID-CRYSTAL DISPLAY DEVICE, AND METHOD FOR THE FORMING AND INSTALLATION OF REFLECTIVE PLATE/SHEET FOR CURVED LIQUID-CRYSTAL DISPLAY DEVICE

(75) Inventors: Masanori Nouchi, Yokohama (JP);
Fumitoshi Matsuda, Yokohama (JP);
Hiromitsu Hashiba, Yamato (JP)

(73) Assignee: Infovision Optoelectronics Holdings Limited, Tortola (VG)

( * ) Notice: Subject to any disclaimer, the term of this patent is extended or adjusted under 35 U.S.C. 154(b) by 541 days.

(21) Appl. No.: 11/423,960

(22) Filed: Jun. 14, 2006

(65) Prior Publication Data
US 2007/0146616 A1  Jun. 28, 2007

(30) Foreign Application Priority Data
Dec. 22, 2005 (JP) ................ 2005-370436

(51) Int. Cl.
G02F 1/1339 (2006.01)
G02F 1/1335 (2006.01)
(52) U.S. Cl. .............. 349/155; 349/153; 349/113
(58) Field of Classification Search .......... 349/155, 349/113, 153
See application file for complete search history.

(56) References Cited

U.S. PATENT DOCUMENTS

| 5,307,190 | A | * | 4/1994 | Wakita et al. ............ 349/158 |
| 5,672,083 | A | * | 9/1997 | Curtin et al. ............ 445/25 |
| 6,332,690 | B1 | | 12/2001 | Murofushi |
| 6,654,071 | B2 | | 11/2003 | Chen |
| 7,190,503 | B2 | * | 3/2007 | Ide ............ 359/245 |
| 2001/0046008 | A1 | | 11/2001 | Ueda et al. |
| 2002/0047952 | A1 | | 4/2002 | Kawata |
| 2006/0098153 | A1 | | 5/2006 | Slikkerveer et al. |
| 2007/0139605 | A1 | * | 6/2007 | Matsuda et al. ........ 349/158 |

FOREIGN PATENT DOCUMENTS

JP  58052513 Y  4/1983
JP  H09-197135 A  7/1997

OTHER PUBLICATIONS

Notice of Allowance and fee due of U.S. Appl. No. 11/382,934 mailed on Mar. 6, 2009.
Office Action of U.S. Appl. No. 11/382,934 mailed on Nov. 26, 2008.
Office Action of U.S. Appl. No. 11/382,934 mailed on Apr. 3, 2008.

* cited by examiner

*Primary Examiner*—Mike Qi
(74) *Attorney, Agent, or Firm*—Nixon Peabody LLP (57) ABSTRACT

Liquid-crystal display device with a concavely curved panel in which a reflective plate is installed with which a uniform brightness of the screen of the liquid-crystal device with curved screen can be maintained and brightness non-uniformities can be remedied, without making the outer shape of the liquid-crystal display device large. In a liquid-crystal display device having a structure in which a concavely curved panel is held by spacers having a curved shape that are installed on a backlight unit, a reflective plate or reflective sheet is attached to all those inner walls formed by an inner space enclosed by the concavely curved panel, the spacers and the backlight unit that are formed by components that are installed between the curved panel and the backlight unit and that are formed by components that are not transmissive to light that is emitted from the light source.

7 Claims, 10 Drawing Sheets

CURVED LIQUID-CRYSTAL DISPLAY DEVICE, AND METHOD FOR THE FORMING AND INSTALLATION OF REFLECTIVE PLATE/SHEET FOR CURVED LIQUID-CRYSTAL DISPLAY DEVICE

BACKGROUND OF THE INVENTION

1. Technical Field

The present invention relates to curved liquid-crystal display devices and methods for forming/installing a reflective plate or reflective sheet used for a curved liquid-crystal display device.

2. Description of the Related Art

In recent years, as liquid-crystal display devices have come to be used as display devices of television receivers, the screens of such liquid-crystal display devices have become increasingly bigger. But a problem with increasingly larger television LCD screens is that the viewing angle difference between the viewing angle when the viewer views the center portion of the screen, and the viewing angle when the viewer views the left and right edges of the screen increases (throughout this specification, the technical term "viewing angle" is defined as the angle between the line of sight of the viewer viewing the screen and the tangent to the intersection between the line of sight and the observed screen surface, and the difference between the center and left/right edge viewing angles is defined as and used to mean the "viewing angle difference").

Furthermore, another problem with large-scale television LCD screens is that glare off the screens also increases. The problem of difference in viewing angle can be corrected by curving the screen into a concave shape.

However, when a backlight with the same structure as that of a flat liquid-crystal panel is used for a liquid-crystal panel whose screen is concavely curved (in the following also referred to as "concavely curved liquid-crystal panel"), then the uniformity of the light that is radiated from the light source within the backlight is lost due to the influence of spacers or the like that are installed between the concavely curved liquid-crystal panel and the backlight at the periphery of the concavely curved liquid-crystal panel. As a result, the uniformity of the screen brightness of concavely curved liquid-crystal panels is lower than the uniformity of the screen brightness of conventional flat liquid-crystal display devices.

Figure 4:
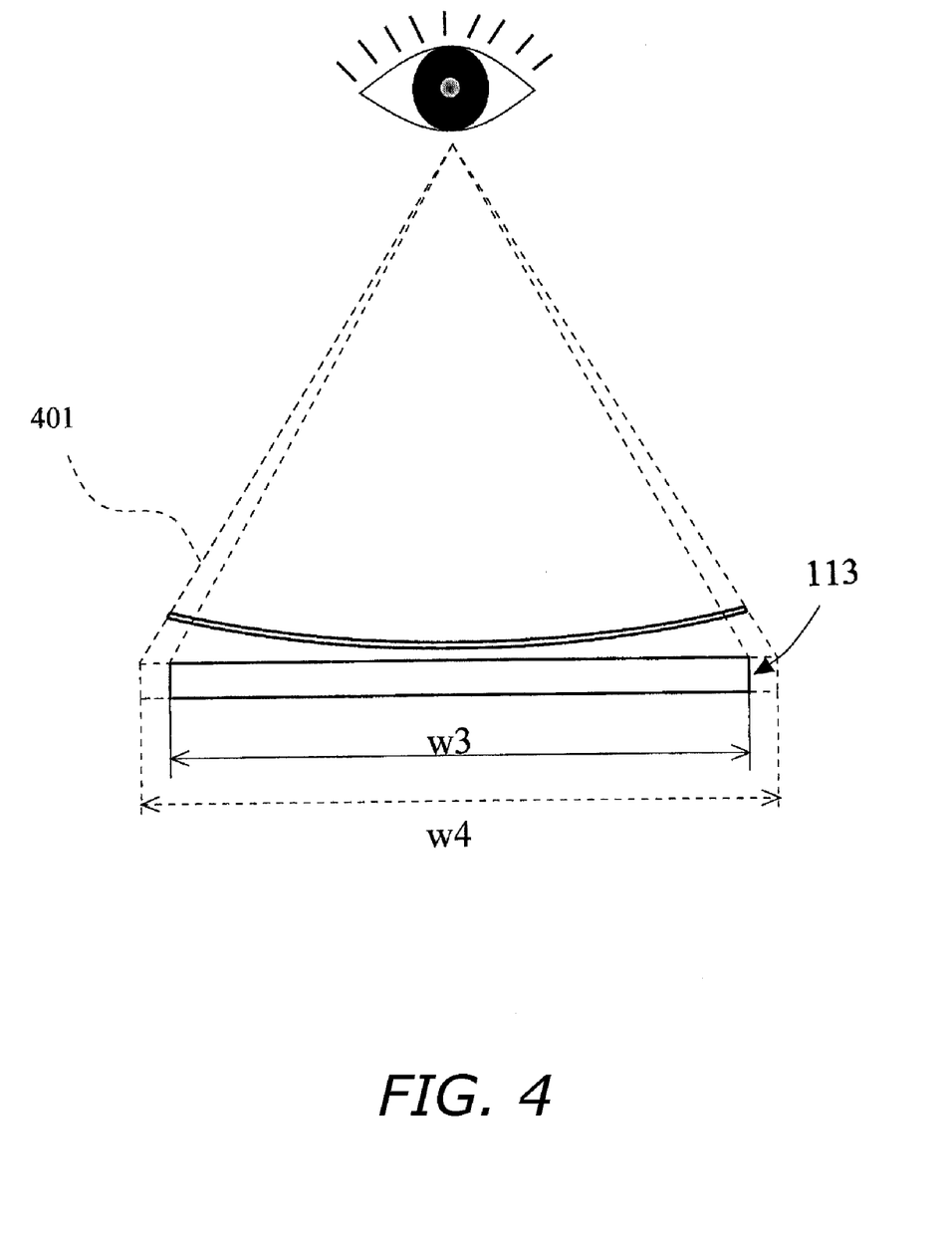
FIG. 4 is a diagrammatic cross-sectional view illustrating the relation between the line of sight of a viewer observing the two edges of a concavely curved liquid-crystal panel and the horizontal width of the backlight.

A countermeasure to this problem is to make the horizontal width of the backlight wider than the horizontal width of the concavely curved liquid-crystal panel, as shown in FIG. 4. The problem and this countermeasure will be explained with reference to FIG. 4.

FIG. 4 is a diagrammatic cross-sectional view illustrating the relation between the line of sight of a viewer observing the two edges of a concavely curved liquid-crystal panel and the horizontal width of the backlight. In order to view images at the two edges of the concavely curved liquid-crystal panel, light rays passing through the line of sight 401 are necessary, and in order to obtain such light rays from a backlight 113, the horizontal width of the backlight 402 is widened to w4. That is to say, the horizontal width of the backlight 402 must be wider than the horizontal width w3 of a liquid-crystal display device whose liquid-crystal panel is flat. This countermeasure is undesirable, since it increases the outer form of the liquid-crystal display device.

Moreover, spacers or the like that support the concavely curved liquid-crystal panel at its rim are necessary, but these spacers are positioned at locations where they can be easily discerned by the viewer, so that when the viewer observes the concavely curved liquid-crystal panel in its usual state from the front, then these spacers may become visible and that portion will appear darker or colored due to the influence of the material or color of the spacers.

Document 1: JP H09-197135A

BRIEF SUMMARY OF THE INVENTION

Accordingly, it is an object of the present invention to provide a liquid-crystal display device having a concavely curved liquid-crystal panel, in which a uniform brightness of the screen of the liquid-crystal device having a curved screen can be maintained and brightness non-uniformities can be suppressed to a minimum, without making the outer shape of the liquid-crystal display device large.

Figure 5:
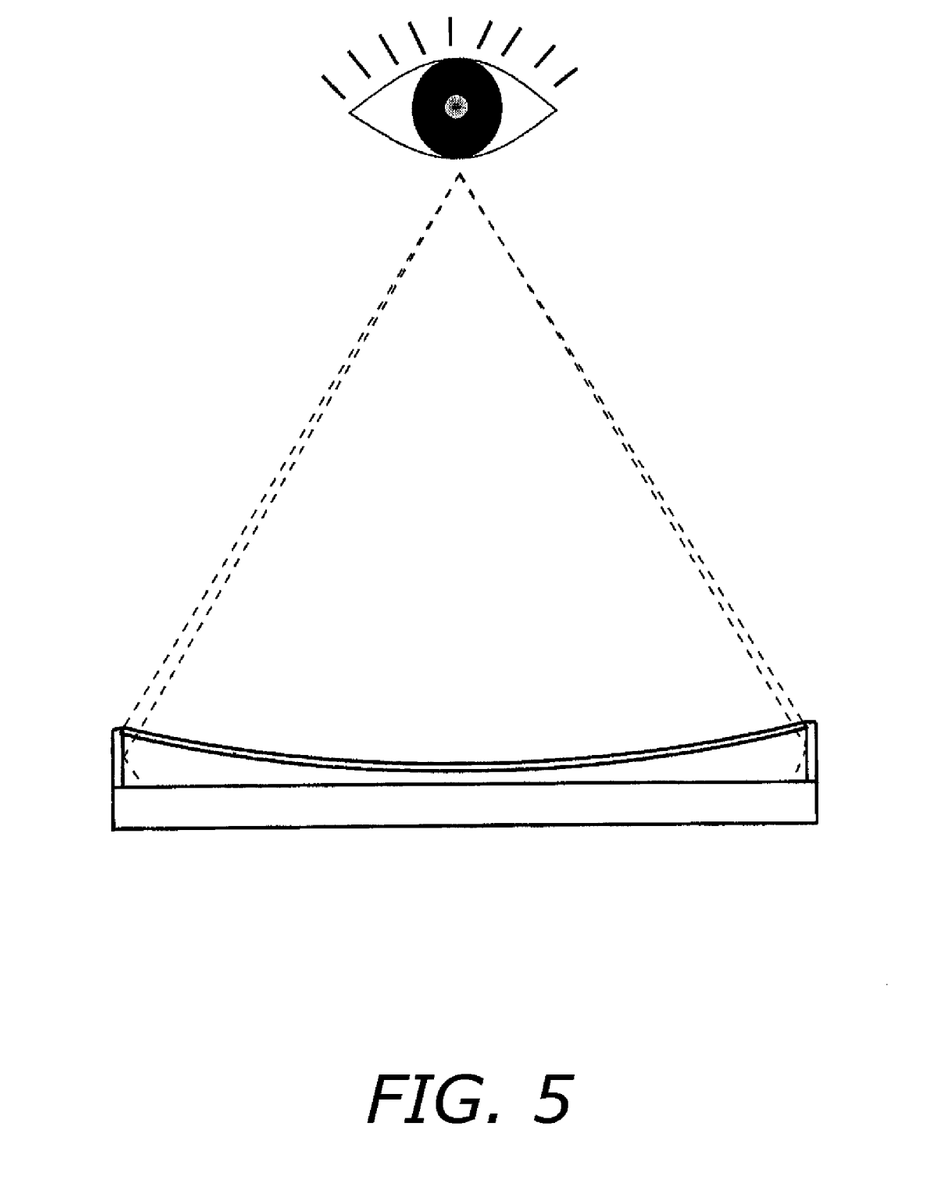
FIG. 5 is a diagram illustrating the relation between the line of sight of a viewer observing a concavely curved liquid-crystal panel, and the reflective plates/sheets.

As a result of optimizing the position at which in particular the reflective plate or reflective sheet is arranged in order to achieve the above-noted object, it was found that it is effective to install the reflective plate or reflective sheet, in addition to its being ordinarily arranged parallel to the liquid-crystal panel behind the light source, also perpendicularly direction, as shown in FIG. 5, and install the reflective plate or reflective sheet at various gaps at which it may at first glance not be believed to be necessary. It should be noted that FIG. 5 is a diagram illustrating the relation between the line of sight of a viewer observing a concavely curved liquid-crystal panel and the reflective plates or reflective sheets.

On the basis of this knowledge, a liquid-crystal display device having a concavely curved liquid-crystal panel according to a first aspect of the present invention is provided with a structure in which the liquid-crystal panel of the liquid-crystal display device is held by first spacers having a concavely curved shape that are installed on a rear side of two opposing edges of the liquid-crystal panel, second spacers having a concavely curved shape that are installed on a front side of the two opposing edges, and third spacers of a constant height that are installed on the rear side of the remaining two edges of the liquid-crystal panel, with the remaining two edges of the liquid-crystal panel being held by the third spacers, wherein a reflective plate or a reflective sheet is attached to an inner surface of the first spacers and the third spacers.

A liquid-crystal display device having a concavely curved liquid-crystal panel according to a second aspect of the present invention is provided with a structure in which the liquid-crystal panel of the liquid-crystal display device is held by first spacers having a concavely curved shape that are installed on a rear side of two opposing edges of the liquid-crystal panel, second spacers having a concavely curved shape that are installed on a front side of the two opposing edges, and third spacers of a constant height that are installed on the rear side of the remaining two edges of the liquid-crystal panel, with the remaining two edges of the liquid-crystal panel being held by the third spacers, wherein, in addition to an inner surface of the first spacers and the third spacers, a reflective plate or reflective sheet is also attached to an inner surface of spacer support portions of the backlight unit supporting the first spacers and the third spacers.

A liquid-crystal display device having a concavely curved liquid-crystal panel according to a third aspect of the present invention is provided with a structure in which the liquid-crystal panel of the liquid-crystal display device is held by first spacers having a concavely curved shape that are installed on a rear side of two opposing edges of the liquid-crystal panel, second spacers having a concavely curved shape that are installed on a front side of the two opposing edges, and third spacers of a constant height that are installed on the rear side of the remaining two edges of the liquid-crystal panel, with the remaining two edges of the liquid-crystal panel being held by the third spacers, wherein a reflective plate or reflective sheet is attached to all those inner walls formed by an inner space enclosed by the liquid-crystal panel, the first spacers, the third spacers and a backlight unit that are formed by components that are installed between the curved liquid-crystal panel and a light source of the backlight unit and that are formed by components that are not transmissive to light that is emitted from the light source.

According to a fourth aspect of the present invention, in a liquid-crystal display device according to any of the first to third aspects, the reflective surface of the reflective plates or reflective sheets is made by attaching a film sheet made of a highly reflective material.

According to a fifth aspect of the present invention, in a liquid-crystal display device according to any of the first to third aspects, the reflective surface of the reflective plates or reflective sheets is made by adhering a film sheet made of a mirror-reflective material.

According to a sixth aspect of the present invention, in a liquid-crystal display device according to any of the first to third aspects, the reflective surface of the reflective plates or reflective sheets is made by coating a highly reflective material.

According to a seventh aspect of the present invention, in a liquid-crystal display device according to any of the first to third aspects, the reflective surface of the reflective plates or reflective sheets is made by coating a mirror-reflective material.

According to an eighth aspect of the present invention, a liquid-crystal display device having a concavely curved liquid-crystal panel is provided with a structure in which the liquid-crystal panel of the liquid-crystal display device is held by first spacers having a concavely curved shape that are installed on a rear side of two opposing edges of the liquid-crystal panel, second spacers having a concavely curved shape that are installed on a front side of the two opposing edges, and third spacers of a constant height that are installed on the rear side of the remaining two edges of the liquid-crystal panel, with the remaining two edges of the liquid-crystal panel being held by the third spacers, wherein the first spacers and the third spacers are made of highly reflective material.

According to a ninth aspect of the present invention, a liquid-crystal display device having a concavely curved liquid-crystal panel is provided with a structure in which the liquid-crystal panel of the liquid-crystal display device is held by first spacers having a concavely curved shape that are installed on a rear side of two opposing edges of the liquid-crystal panel, second spacers having a concavely curved shape that are installed on a front side of the two opposing edges, and third spacers of a constant height that are installed on the rear side of the remaining two edges of the liquid-crystal panel, with the remaining two edges of the liquid-crystal panel being held by the third spacers, wherein the first spacers and the third spacers are made of mirror-reflective material.

According to a tenth aspect of the present invention, a method for forming/installing a reflective plate or reflective sheet used in a liquid-crystal display device having a concavely curved liquid-crystal panel is provided, the liquid-crystal display device thereby being provided with a structure in which the liquid-crystal panel of the liquid-crystal display device is held by first spacers having a concavely curved shape that are installed on a rear side of two opposing edges of the liquid-crystal panel, second spacers having a concavely curved shape that are installed on a front side of the two opposing edges, and third spacers of a constant height that are installed on the rear side of the remaining two edges of the liquid-crystal panel, with the remaining two edges of the liquid-crystal panel are held by the third spacers, the method comprising a step of installing the reflective plate or reflective sheet on an inner surface of the first spacers and the third spacers.

According to an eleventh aspect of the present invention, a method for forming/installing a reflective plate or reflective sheet used in a liquid-crystal display device having a concavely curved liquid-crystal panel is provided, the liquid-crystal display device thereby being provided with a structure in which the liquid-crystal panel of the liquid-crystal display device is held by first spacers having a concavely curved shape that are installed on a rear side of two opposing edges of the liquid-crystal panel, second spacers having a concavely curved shape that are installed on a front side of the two opposing edges, and third spacers of a constant height that are installed on the rear side of the remaining two edges of the liquid-crystal panel, with the remaining two edges of the liquid-crystal panel being held by the third spacers, the method comprising a step of forming the reflective plate or reflective sheet by coating a highly reflective material on an inner surface of the first spacers and the third spacers.

According to a twelfth aspect of the present invention, a method for forming/installing a reflective plate or reflective sheet used in a liquid-crystal display device having a concavely curved liquid-crystal panel is provided, the liquid-crystal display device thereby being provided with a structure in which the liquid-crystal panel of the liquid-crystal display device is held by first spacers having a concavely curved shape that are installed on a rear side of two opposing edges of the liquid-crystal panel, second spacers having a concavely curved shape that are installed on a front side of the two opposing edges, and third spacers of a constant height that are installed on the rear side of the remaining two edges of the liquid-crystal panel, with the remaining two edges of the liquid-crystal panel being held by the third spacers, the method comprising a step of attaching the reflective plate or reflective sheet to all the inner walls formed by an inner space enclosed by the liquid-crystal panel, the first spacers, the third spacers and a backlight unit that are formed by components that are installed between the curved liquid-crystal panel and a light source of the backlight unit and that are formed by components that are not transmissive to light that is emitted from the light source.

According to a thirteenth aspect of the present invention, a method for forming/installing a reflective plate or reflective sheet used in a liquid-crystal display device having a concavely curved liquid-crystal panel is provided, the liquid-crystal display device thereby being provided with a structure in which the liquid-crystal panel of the liquid-crystal display device is held by first spacers having a concavely curved shape that are installed on a rear side of two opposing edges of the liquid-crystal panel, second spacers having a concavely curved shape that are installed on a front side of the two opposing edges, and third spacers of a constant height that are installed on the rear side of the remaining two edges of the liquid-crystal panel, with the remaining two edges of the liquid-crystal panel being held by the third spacers, the method comprising a step of forming the reflective plate or reflective sheet by coating a highly reflective material onto all the inner walls forming an inner space enclosed by the liquid-crystal panel, the first spacers, the third spacers and a backlight unit-walls that are formed by components that are installed between the curved liquid-crystal panel and a light source of the backlight unit and that are formed by components that are not transmissive to light that is emitted from the light source.

According to a fourteenth aspect of the present invention, in a liquid-crystal display device according to any of the first to third, eighth and ninth aspects, the first spacers are installed on the rear side of the two longer opposing edges and the second spacers are installed on the front side of the two longer opposing edges.

According to a fifteenth aspect of the present invention, in a liquid-crystal display device according to the fourth aspect, the first spacers are installed on the rear side of the two longer opposing edges and the second spacers are installed on the front side of the two longer opposing edges.

According to a sixteenth aspect of the present invention, in a liquid-crystal display device according to the fifth aspect, the first spacers are installed on the rear side of the two longer opposing edges and the second spacers are installed on the front side of the two longer opposing edges.

According to a seventeenth aspect of the present invention, in a liquid-crystal display device according to the sixth aspect, the first spacers are installed on the rear side of the two longer opposing edges and the second spacers are installed on the front side of the two longer opposing edges.

According to a eighteenth aspect of the present invention, in a liquid-crystal display device according to the seventh aspect, the first spacers are installed on the rear side of the two longer opposing edges and the second spacers are installed on the front side of the two longer opposing edges.

According to a nineteenth aspect of the present invention, in a method for forming/installing a reflective plate or reflective sheet used in a liquid-crystal display device according to any of the tenth to thirteenth aspects, the first spacers are installed on the rear side of the two longer opposing edges and the second spacers are installed on the front side of the two longer opposing edges.

With the first aspect of the present invention, the problem of brightness non-uniformities occurring at both the left and right edges of a concavely curved liquid-crystal panel and the problem that spacers installed behind the liquid-crystal panel are visible through the liquid-crystal panel can be remedied without broadening the lateral width of the backlight.

With the second aspect of the present invention, in addition to the effect of the first aspect of the present invention, it is possible to further remedy brightness non-uniformities and the like with the reflective plate or reflective sheet attached to the inner surface of the spacer support portions of the backlight unit supporting the first spacers and the third spacers.

With the third aspect of the present invention, in addition to the effect of the second aspect of the present invention, it is possible to further remedy brightness non-uniformities, for example.

With the fourth aspect of the present invention, in addition to the effect of the first to third aspects of the present invention, the fabrication of the reflective plate or reflective sheet becomes easier.

With the fifth aspect of the present invention, the same effect as in the fourth aspect can be attained.

With the sixth aspect of the present invention, the same effect as in the fourth aspect can be attained.

With the seventh aspect of the present invention, the same effect as in the fourth aspect can be attained.

With the eighth aspect of the present invention, the same effect as in the first to seventh aspects can be attained.

With the ninth aspect of the present invention, the same effect as in the first aspect can be attained without separately attaching the reflective plate or reflective sheet to spacers.

With the tenth aspect of the present invention, the same effect as in the ninth aspect can be attained.

With the eleventh aspect of the present invention, in addition to the effect of the third aspect of the present invention, it is possible to further remedy brightness non-uniformities, for example.

With the twelfth aspect of the present invention, the same effect as in the third aspect can be attained.

With the thirteenth aspect of the present invention, the same effect as in the twelfth aspect can be attained.

With the fourteenth aspect of the present invention, the same effect as in the first to third, eighth and ninth aspects can be attained.

With the fifteenth aspect of the present invention, the same effect as in the fourth aspect can be attained.

With the sixteenth aspect of the present invention, the same effect as in the fifth aspect can be attained.

With the seventeenth aspect of the present invention, the same effect as in the sixth aspect can be attained.

With the eighteenth aspect of the present invention, the same effect as in the seventh aspect can be attained.

With the nineteenth aspect of the present invention, the same effect as in the tenth to thirteenth aspects can be attained.

From the following detailed description in conjunction with the accompanying drawings, the foregoing and other objects, features, aspects and advantages of the present invention will become readily apparent to those skilled in the art.

DETAILED DESCRIPTION OF THE INVENTION

The following is a description of preferred embodiments of the invention, with reference to the accompanying drawings. It should be noted that the following explanations are only for a reflective plate, but similar embodiments can also be established by replacing this reflective plate with a reflective sheet.

Figure 10:
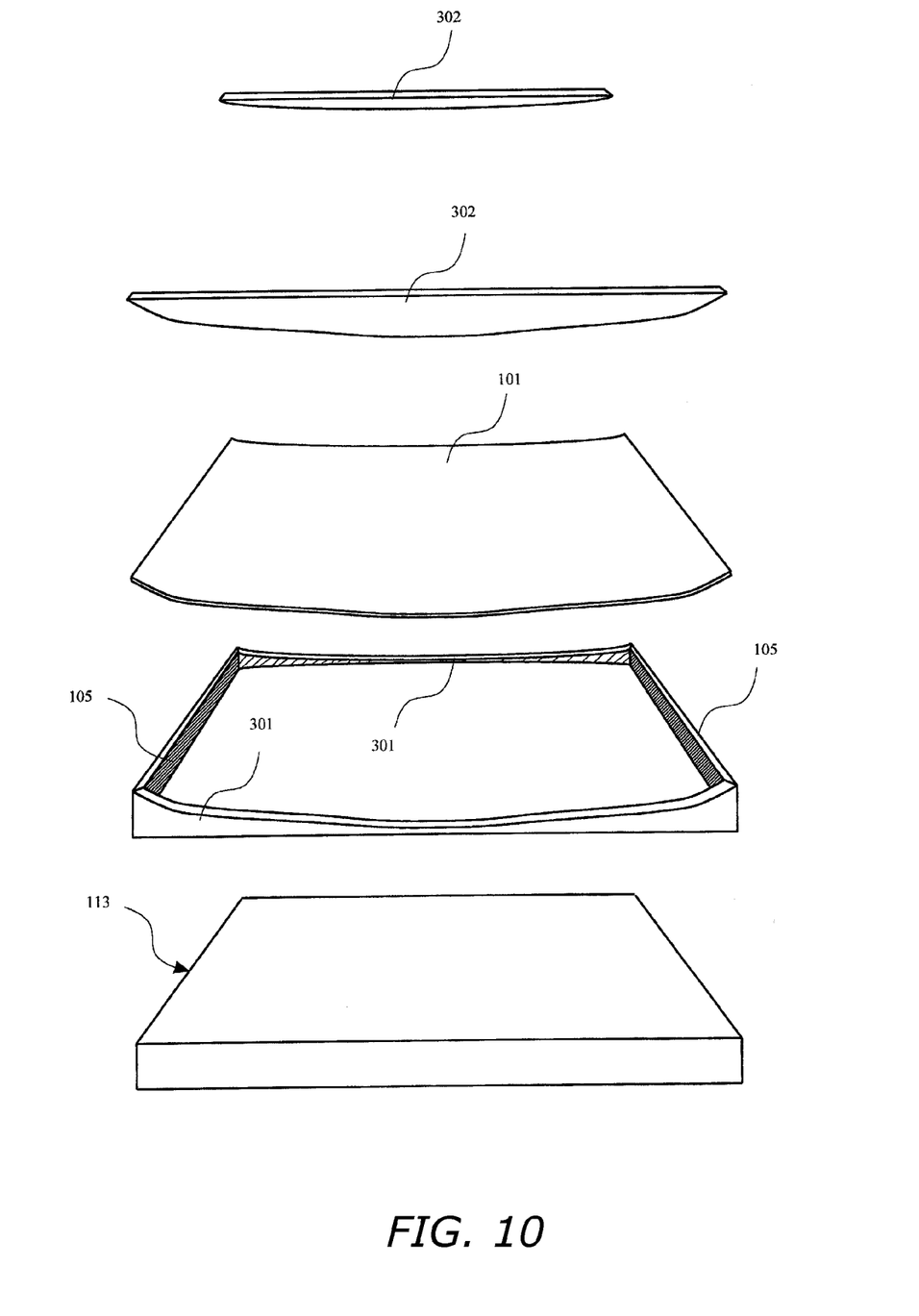
FIG. 10 is an exploded view of the main components of a liquid-crystal display device having a concavely curved panel that is common to Embodiments 1 to 5.

First, a liquid-crystal display device having a concavely curved panel that is common to the below-explained Embodiments 1 to 5 is described. FIG. 10 is an exploded view of the main components of a liquid-crystal display device having a concavely curved panel, which is common to Embodiments 1 to 5. In FIG. 10, numeral 101 denotes a liquid-crystal panel, numeral 301 denotes first spacers, numeral 105 denotes third spacers, numeral 302 denotes second spacers and numeral 113 denotes a backlight unit.

Two opposite edges of the liquid-crystal panel 101 are sandwiched by the first spacers 301 and the second spacers 302, which have a concavely curved shape. The other two edges are supported by the third spacers 105, which have a constant height. These other two edges are fixed by pressing them down with a bezel or the like, which is not shown in the drawing. The liquid-crystal display devices according to embodiments of the present invention all have such a structure. The following is an explanation of the respective embodiments.

EMBODIMENT 1

Figure 1:
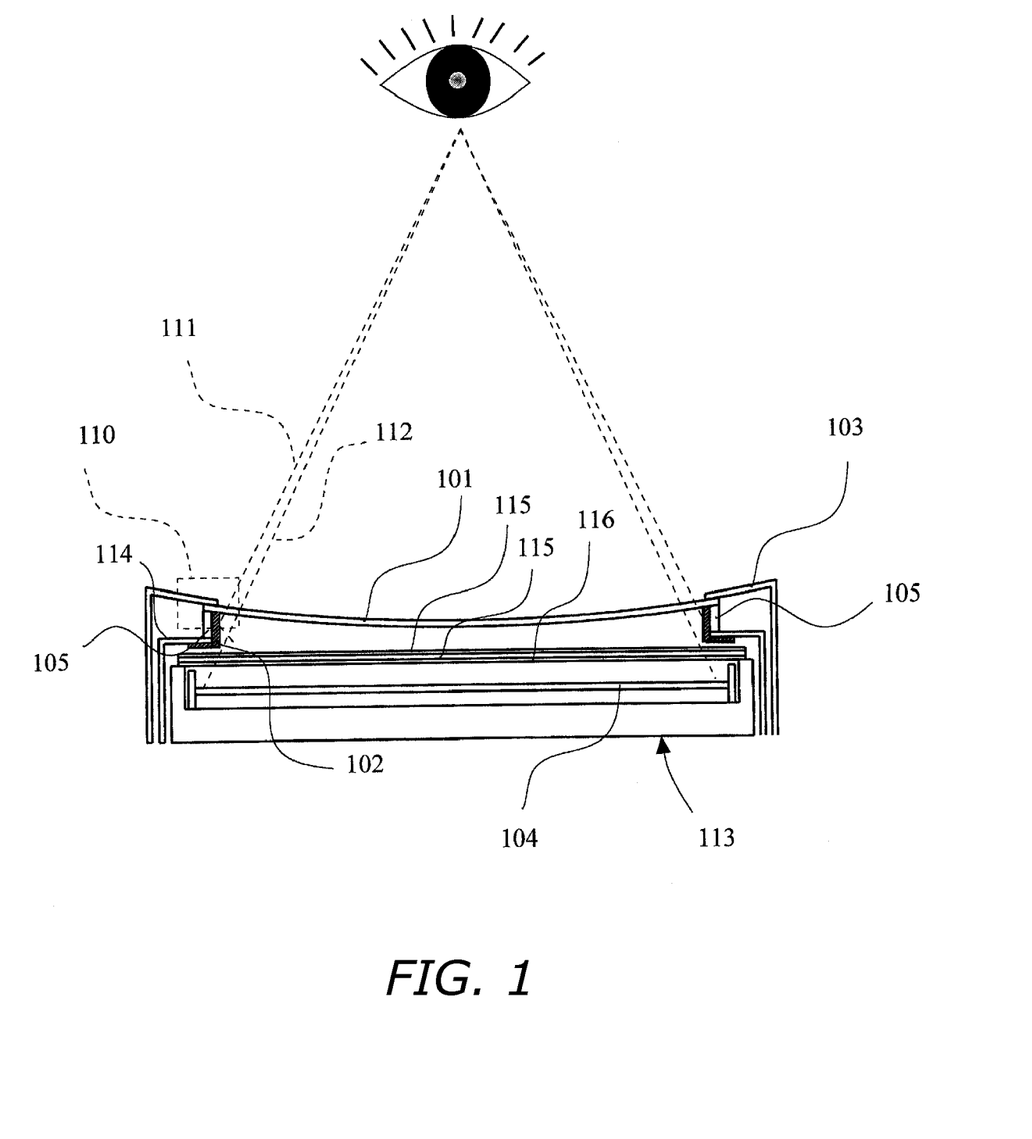
FIG. 1 is a diagrammatic cross-sectional view illustrating a situation in which reflective plates/sheets are installed in a liquid-crystal display device having a concavely curved panel according to Embodiment 1
Figure 3:
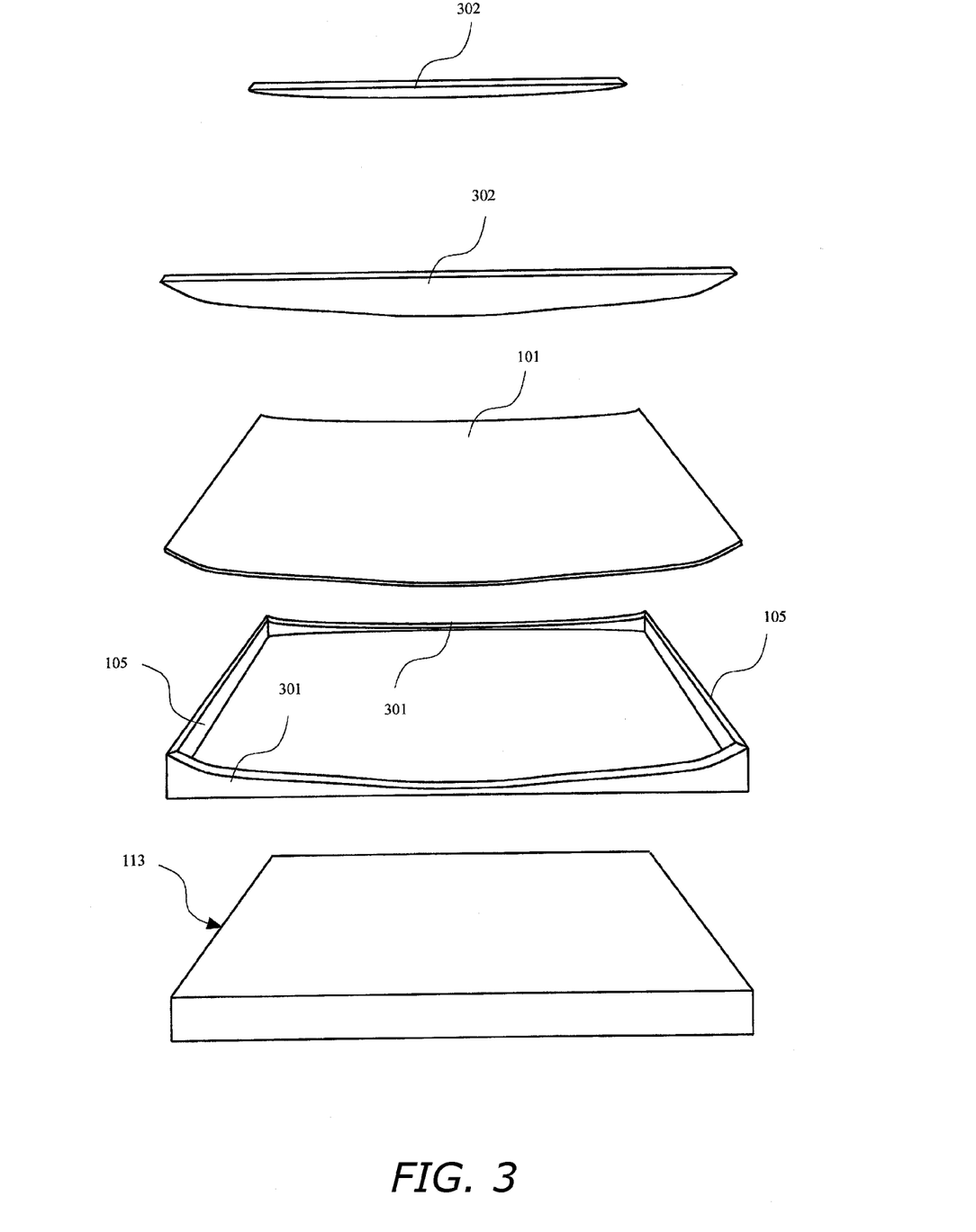
FIG. 3 is an exploded view of a liquid-crystal panel 101, third spacers 105, first spacers 301 and a backlight unit 113, which are the main components of a liquid-crystal display device having a concavely curved panel according to Embodiment 1.

FIG. 1 is a diagrammatic cross-sectional view illustrating a situation in which reflective plates are installed in a liquid-crystal display device having a concavely curved panel according to Embodiment 1. The liquid-crystal panel 101 is held by the third spacers 105 above the backlight unit 113. Reflective plates 102 are installed on the inner wall of the third spacers 105. The reflective plates are also installed on the spacers in the direction perpendicular to the third spacers 105 shown in FIG. 1. Those perpendicular spacers are the first spacers 301 in FIG. 3. The reflective plates are also installed on the inner walls of the first spacers 301. It should be noted that FIG. 3 is an exploded view of the liquid-crystal panel 101, the third spacers 105, the first spacers 301 and the backlight unit 113, which are the main components of the liquid-crystal display device having a concavely curved panel according to Embodiment 1.

The general locations where the reflective plates are installed are shown by the figures.

FIG. 10 is an exploded view showing the general locations where the reflective plates are installed. The reflective plates are installed on the inner walls of the first spacers 301 and the inner walls of the third spacers 105, as indicated by the oblique lines.

Figure 2:
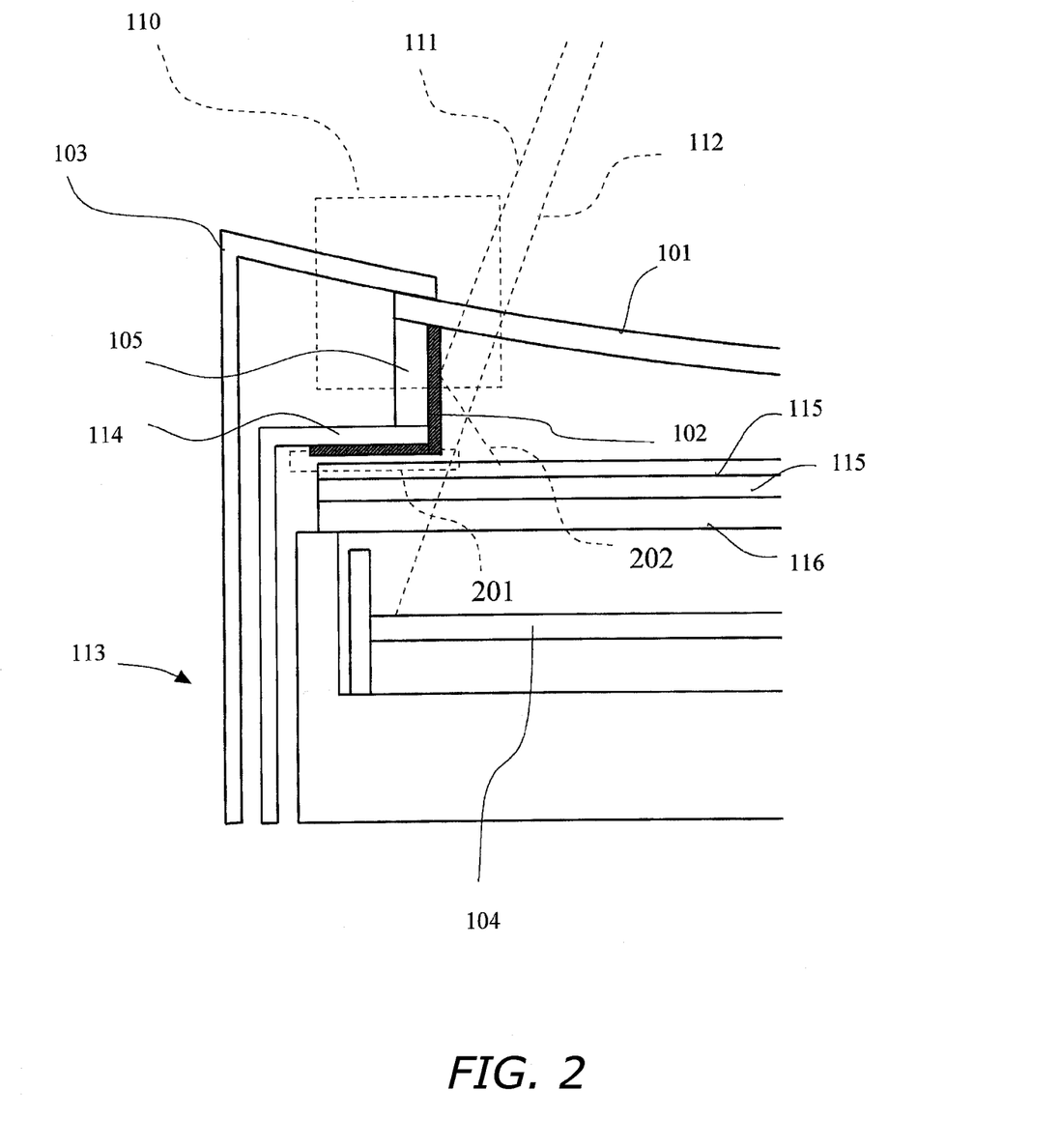
FIG. 2 is an enlarged cross-sectional view of the left edge portion in FIG. 1.

FIG. 2 is an enlarged cross-sectional view of the left edge portion in FIG. 1. Ordinarily, there is a small gap 201 below a support portion 114 to which the third spacer 105 is attached. Optical sheets 115, 115 and a dispersion plate 116 are installed below the gap 201. It should be noted that a part of the frame of the backlight unit 113 functions as the spacer support portion 114.

The reflective plate 102 is installed on the inner wall of this narrow gap 201. Through this measure, brightness non-uniformities at the edge portions 110 can be remedied.

The following is an explanation of reasons for and the effect of installing the reflective plates in this manner.

If the viewer views the edge portion 110 of a liquid-crystal panel 101 in which no reflective plates 102 are installed as in the liquid-crystal display device having the structure shown in FIGS. 1, 2 and 3, then the viewer would view the third spacers 105 through the liquid-crystal panel 101, and there would be brightness non-uniformities and the like.

This is explained in more detail with reference to FIG. 1 and FIG. 2. If the edge portion 110 of a liquid-crystal panel 101 as shown in FIG. 1 but without the reflective plates 102 were viewed, then the line of sight 111 from the viewer could not reach the light source 104 after passing through the liquid-crystal panel 101. This is because this path is blocked by components such as the third spacers 105.

Conversely, considering the light rays directed from the light source 104 through the line of sight 111 into the viewer's eye, the presence of the third spacers 105 would pose an obstacle to such light rays, and there are no direct light rays that reach the viewer's eye from the light source 104 through the edge portion 110 of the liquid-crystal panel 101. Consequently, even considering indirect light, at the edge portions of the liquid-crystal panel 101, the amount of light rays reaching the viewer's eye after having passed through the liquid-crystal panel 101 from the rear side of the liquid-crystal panel 101 is smaller than at other portions of the liquid-crystal panel 101. In other words, at the edge portions 110 of the liquid-crystal panel 101, the effect that the backlight has on the liquid-crystal cannot be properly displayed, and there is the phenomenon that there are brightness non-uniformities and that the inner walls of the third spacers 105 are visible to the viewer.

If, as a countermeasure to this problem, the reflective plates 102 are installed on the inner walls of the third spacers 105, then the light rays 202 from the light source 104 are reflected at the reflective plates 102, and incident on the viewer's eye through the line of sight 111. As a result, the problem of brightness non-uniformities and the problem that the inner walls of the third spacers 105 become visible to the viewer can be solved. It should be noted that this problem can also be solved by enlarging the width of the backlight unit 113 to a width corresponding to the front end of the line of sight 401, as shown in FIG. 4. However, with this approach, the width of the backlight unit has to be enlarged, and as a result, the dimensions of the outer shape of the liquid-crystal display apparatus have to be made larger.

With the method of installing reflective plates 102 as shown in FIG. 1, it is possible to solve the problem without enlarging the outer shape of the liquid-crystal display device and to satisfy the requirement of slimmer casings that are demanded for display devices.

EMBODIMENT 2

Figure 6:
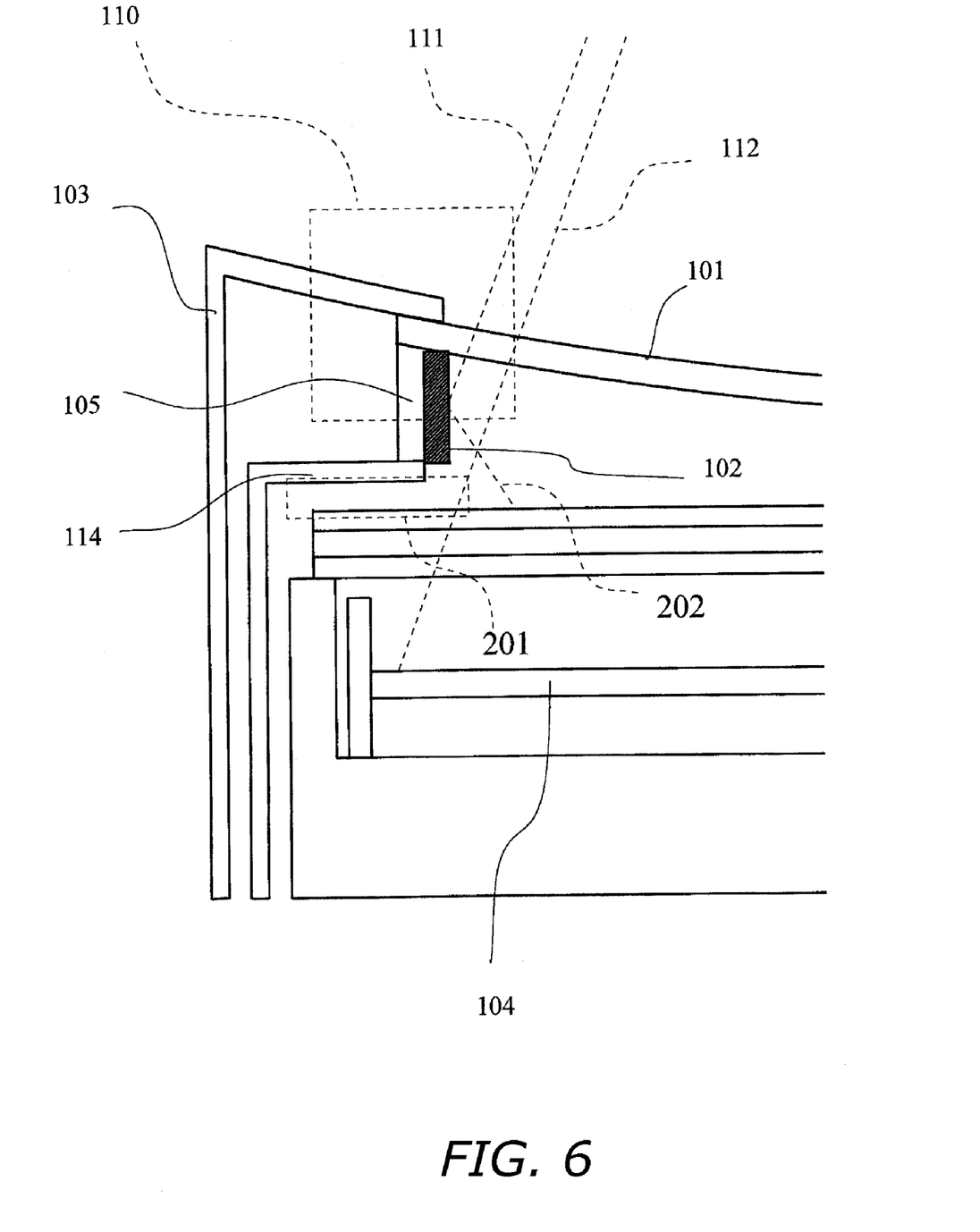
FIG. 6 is a diagrammatic cross-sectional view illustrating a state in which reflective plates are installed in a liquid-crystal display device having a concavely curved panel according to Embodiment 2.

FIG. 6 is a diagrammatic cross-sectional view illustrating the state in which reflective plates are installed in a liquid-crystal display device having a concavely curved panel according to Embodiment 2. The difference between the installation state of the reflective plates of the liquid-crystal display device having a concavely curved panel according to Embodiment 2 and the installation state of the reflective plates of the liquid-crystal display device having a concavely curved panel according to Embodiment 1 is that the reflective plates of the liquid-crystal display device having a concavely curved panel according to Embodiment 1 are also installed on components other than the spacers, whereas the reflective plates of the liquid-crystal display device having a concavely curved panel according to Embodiment 2 are not installed on any components other than the spacers. With reflective plates installed in this manner, the attained effect does not reach the effect of the liquid-crystal display device having a concavely curved panel according to Embodiment 1, but the occurrence of brightness non-uniformities is to some extent better than if no reflective plates are provided, and also the manufacturing costs can be reduced slightly by omitting the process of installing reflective plates on the gap 201.

EMBODIMENT 3

Figure 7:
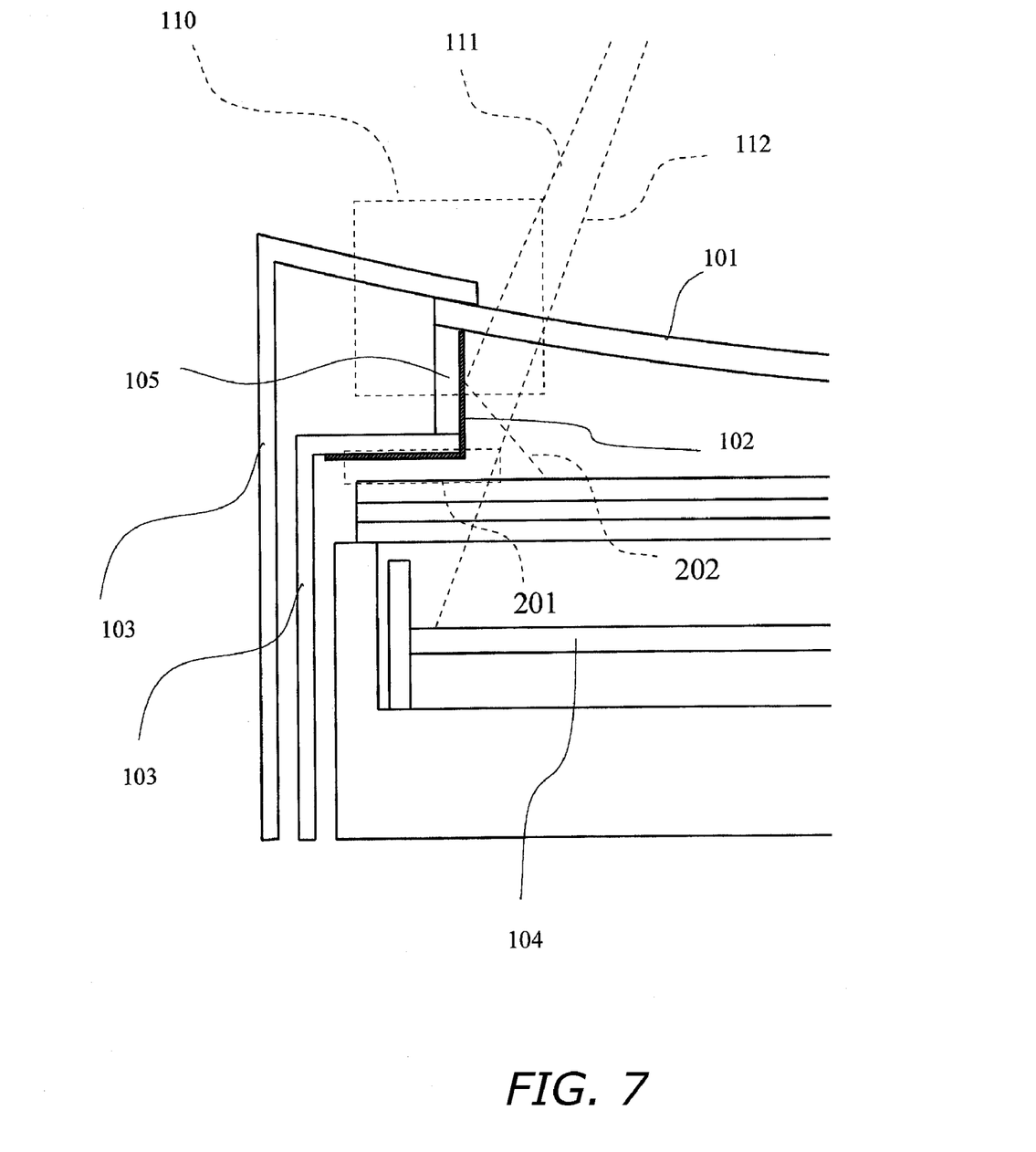
FIG. 7 is a diagrammatic cross-sectional view illustrating a method for forming/installing reflective plates in a liquid-crystal display device having a concavely curved panel according to Embodiment 3.

FIG. 7 is a diagrammatic cross-sectional view illustrating a method for forming/installing reflective plates in a liquid-crystal display device having a concavely curved panel according to Embodiment 3. The characteristic feature of the method for forming/installing reflective plates in a liquid-crystal display device having a concavely curved panel according to Embodiment 3 is the aspect that the reflective plates are constituted by a highly reflective material applied to the inner walls of the spacers. If the reflective plates are formed in this manner, the step of installing reflective plates on the spacers or the like becomes unnecessary, extremely thin reflective plates can be formed, and a slight contribution to making the overall liquid-crystal display device smaller can be made.

EMBODIMENT 4

Figure 8:
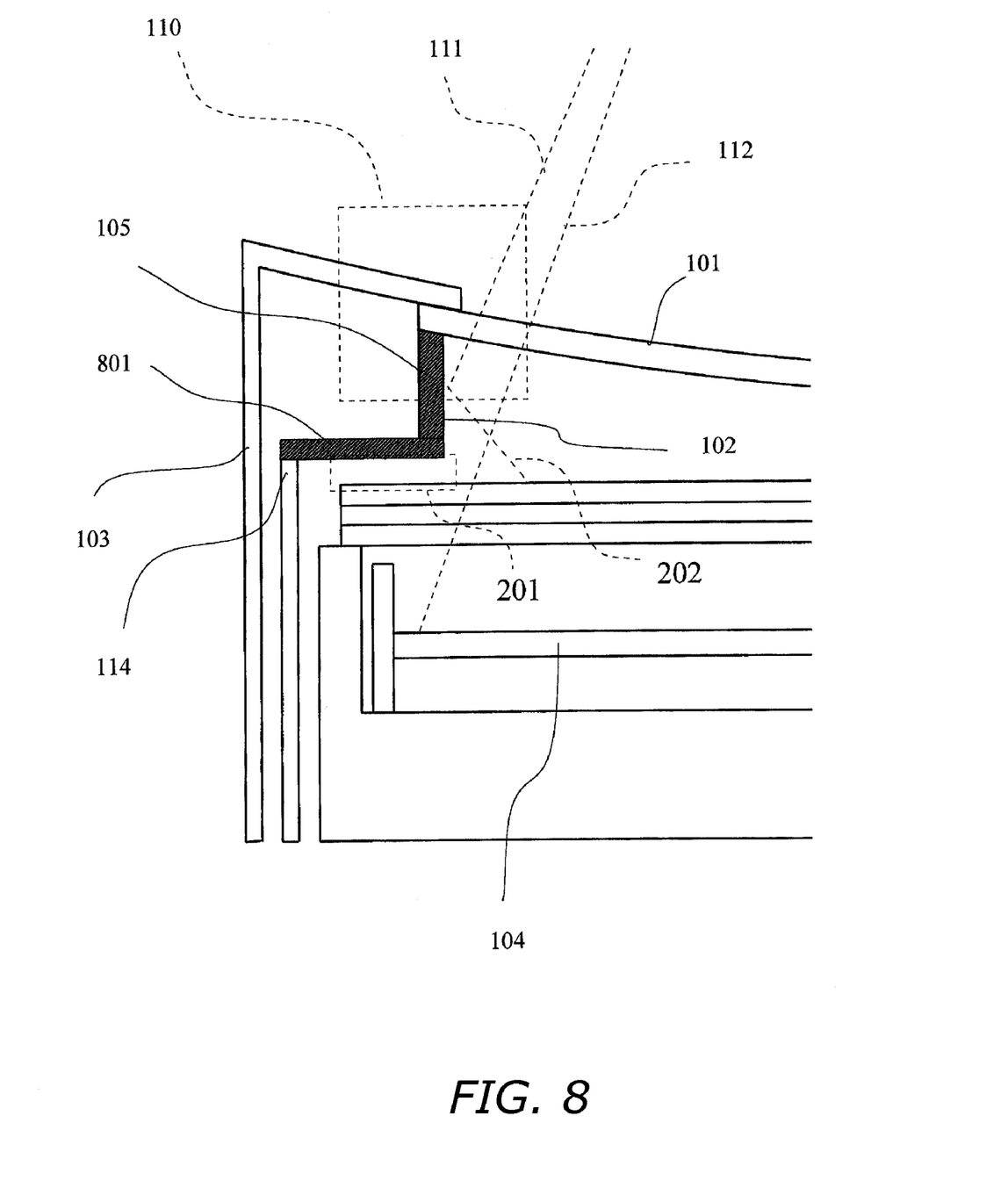
FIG. 8 is a diagrammatic cross-sectional view illustrating a liquid-crystal display device having a concavely curved panel according to Embodiment 4.

FIG. 8 is a diagrammatic cross-sectional view illustrating a liquid-crystal display device having a concavely curved panel according to Embodiment 4. The characteristic feature of this liquid-crystal display device having a concavely curved panel according to Embodiment 4 is the aspect of making, for example, the spacers themselves of a highly reflective material, instead of attaching the reflective plates to spacers or the like or applying a highly reflective material on them.

EMBODIMENT 5

Figure 9:
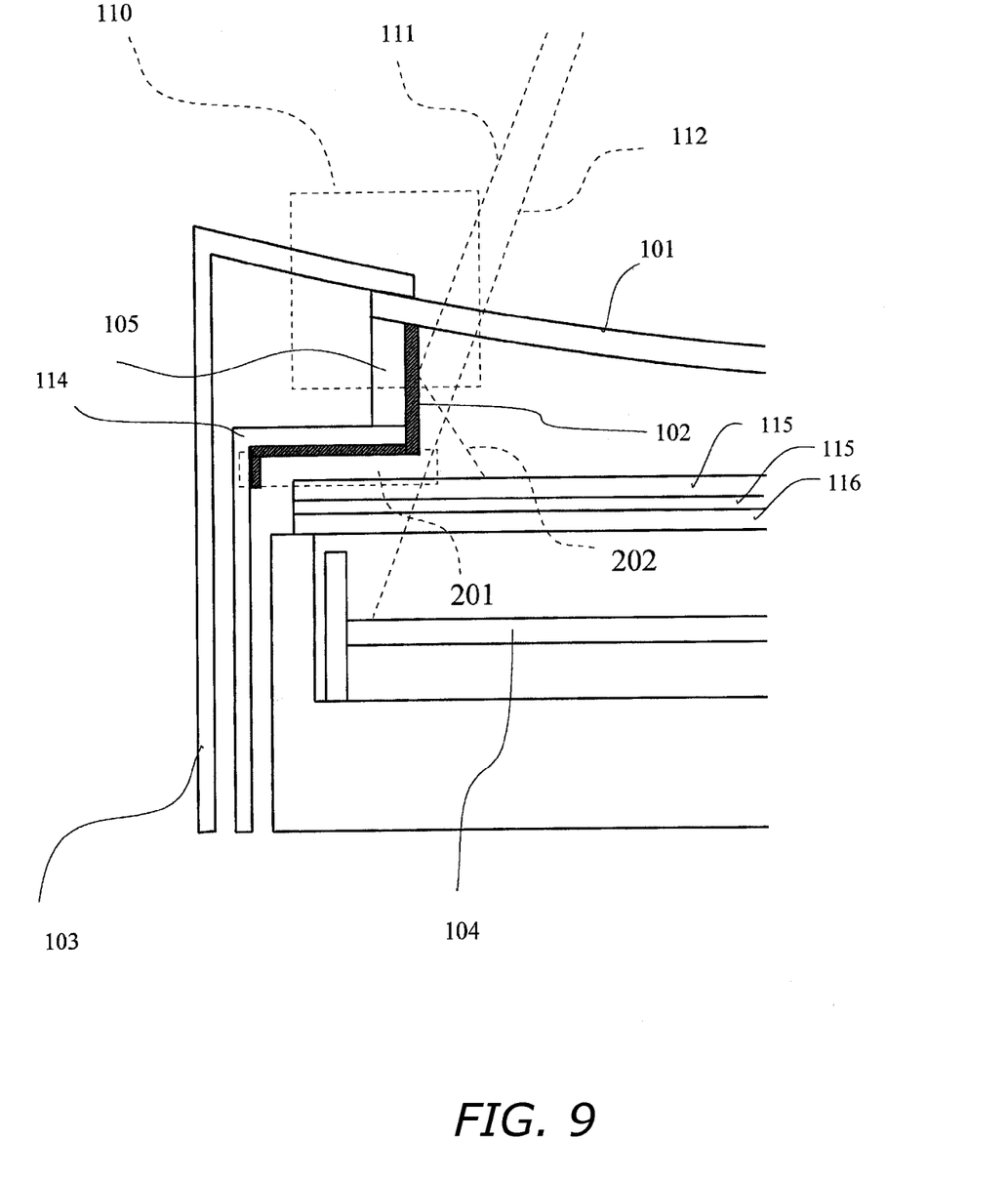
FIG. 9 is a diagrammatic cross-sectional view illustrating a liquid-crystal display device having a concavely curved panel according to Embodiment 5.

FIG. 9 is a diagrammatic cross-sectional view illustrating a liquid-crystal display device having a concavely curved panel according to Embodiment 5. The characteristic feature of this liquid-crystal display device having a concavely curved panel according to Embodiment 5 is the aspect that the locations where the reflective plates are installed are not only the third spacers 105 and the first spacers 301 supporting the concavely curved panel, but reflective plates are laid out on the inner walls of all components constituting the inner walls of the space enclosed by the liquid-crystal panel 101 and the backlight unit 108, with the exception of the liquid-crystal panel 101 and transparent components through which the light that is emitted from the light source 104 is expected to pass.

This is explained in more detail with reference to FIG. 9. In FIG. 9, the components constituting the inner walls are the liquid-crystal panel 101, the third spacers 105, the spacer support portions 114, the optical sheets 115, 115 and the dispersion plate 116. Here, the optical sheets 115, 115 and the dispersion plate 116 correspond to transparent components through which light emitted from the light source 104 can be expected to pass, so that the reflective plates are not installed thereon.

As a result, the inner walls on which the reflective plates are installed are the third spacers 105 and the spacer support portions 114, which are the portions marked by oblique lines in FIG. 9. Thus, the occurrence of brightness non-uniformities at the edge portion 110 of the liquid-crystal panel 101 can be reduced to a minimum through installing the reflective plates.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

What is claimed is:

1. A liquid-crystal display device comprising:
    a concavely curved liquid-crystal panel having front and rear sides, and first and second pairs of opposing edges;
    concavely curved first spacers installed on the rear side of said liquid-crystal panel, along its first pair of opposing edges;
    concavely curved second spacers installed on the front side of said liquid-crystal panel, along its first pair of opposing edges, said panel therein being retained along its first pair of opposing edges in between said first and second spacers;
    third spacers of uniform height, installed on the rear side of said liquid-crystal panel along, for retaining its second pair of opposing edges;
    a backlight unit arranged rearward of said liquid-crystal panel;
    a frame supporting said backlight unit, said frame having spacer support portions supporting said first and third spacers; and
    means for lending optical reflectivity to said first and third spacers, and said spacer support portions along their inner surfaces.

2. The liquid-crystal display device according to claim 1, wherein said means for lending optical reflectivity comprises a film sheet made of a highly reflective material or a mirror-quality reflective material.

3. The liquid-crystal display device according to claim 1, wherein said means for lending optical reflectivity comprises a highly reflective coating or a mirror-quality reflective coating.

4. The liquid-crystal display device according to claim 1, wherein the liquid-crystal panel edges constituting the first pair are longer than the edges constituting the second pair.

5. A method of manufacturing a curved liquid-crystal display device comprising:
    installing concavely curved first spacers on the rear side of a concavely curved liquid-crystal panel, along a first pair of opposing edges thereof;
    installing concavely curved second spacers on the front side of the liquid-crystal panel, along the first pair of opposing edges thereof, to retain the panel along its first pair of opposing edges in between the first and second spacers;
    installing third spacers of uniform height on the rear side of the liquid-crystal panel along a second pair of opposing edges thereof; and
    installing either reflective plating or reflective sheeting on inner surfaces of the first spacers and the third spacers.

6. The method of manufacturing the curved liquid-crystal display device according to claim 5, further comprising installing either reflective plating or reflective sheeting on inner walls of spacer supporting portions of a frame for supporting said first and third spacers.

7. The method of manufacturing the curved liquid-crystal display device according to claim 5 or claim 6, wherein the first and second spacers are installed respectively on the front and rear sides of opposing edges of the liquid-crystal panel that are the two longer of the two pairs of opposing edges.

\* \* \* \* \*